United States Patent
Browne et al.

(10) Patent No.: US 6,829,748 B1
(45) Date of Patent: Dec. 7, 2004

(54) AUTOMATIC KERNING OF TEXT (75) Inventors: Cameron Bolitho Browne, Burleigh Heads (AU); Michael Richard Arnold, Surry Hills (AU); Paul Quentin Scott, Pymble (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/449,969

(22) Filed: Nov. 26, 1999

(30) Foreign Application Priority Data

Nov. 27, 1998 (AU) .............................................. PP7404
Dec. 15, 1998 (AU) .............................................. PP7718

(51) Int. Cl.$^7$ ............................................. G06F 17/21
(52) U.S. Cl. ..................... 715/531; 345/468; 345/471; 345/636
(58) Field of Search ................................ 715/521, 519, 715/518, 531; 345/467, 468, 469, 469.1, 470, 472.3, 441, 636, 781, 471

(56) References Cited

U.S. PATENT DOCUMENTS

| | | | |
|---|---|---|---|
| 5,432,890 A | | 7/1995 | Watanabe .................. 395/100 |
| 5,501,538 A | * | 3/1996 | Sawada et al. ............. 400/304 |
| 5,609,427 A | | 3/1997 | Takasawa et al. ........... 400/304 |
| 5,724,596 A | | 3/1998 | Lathrop ...................... 395/781 |
| 5,740,456 A | * | 4/1998 | Harel et al. ................. 715/518 |
| 5,768,490 A | * | 6/1998 | Hersch et al. .............. 345/468 |
| 5,803,629 A | | 9/1998 | Neville et al. .............. 400/304 |
| 5,883,637 A | * | 3/1999 | Nakayama et al. ......... 345/467 |
| 5,937,420 A | * | 8/1999 | Karow et al. ............... 715/518 |
| 6,504,545 B1 | * | 1/2003 | Browne et al. ............. 345/473 |

FOREIGN PATENT DOCUMENTS

EP 0 821 312 A2 1/1998

* cited by examiner

Primary Examiner—Stephen S. Hong
Assistant Examiner—Matthew Ludwig
(74) Attorney, Agent, or Firm—Fitzpatrick, Cella, Harper & Scinto (57) ABSTRACT

The kerning of text modified in various ways is disclosed. The text can be modified by distortion or perturbation. In one way no unmodified text character pair kerning distance is stored. The kerning distance (x) is calculated as typesetting proceeds. In another way, an unmodified text character pair kerning distance ($k_1$) is used but modified by the amplitude of the text perturbing functions.

9 Claims, 8 Drawing Sheets

AUTOMATIC KERNING OF TEXT

The present invention relates to kerning and, in particular, a method of adjusting the kerning distance between adjacent characters either with or without use of previously stored kerning distances for character pairs.

BACKGROUND ART

The traditional way of automatically providing kerning is to have a look-up table for each possible pair of characters in a font giving the kerning distance for that pair of characters. In this way the printer or other display device knows to what extent the spacing between the characters should be adjusted in order to give an aesthetically pleasing result. The kerning distances entered in such memories or look-up tables are essentially empirically derived.

This process is difficult if the number of characters is very large since the number of entries in the look-up table then very substantially expands. One approach to this problem is described in U.S. Pat. No. 5,432,890 (Canon KK) in which essentially unidirectional data is used to modify the kerning distance.

The above described arrangement works well with regular character fonts, however, as will be explained hereafter, problems can arise with fonts which are modified, or have some form of perturbation, or are in some way irregular.

Since the use of modified, perturbed or otherwise irregular fonts is increasing, the present invention seeks to find a way of automatically adjusting the kerning distance between adjacent characters in order to provide a kerning method which, whilst able to be used with regular characters, is also able to be used with modified or otherwise irregular characters.

SUMMARY OF THE INVENTION

In accordance with the first aspect of the present invention there is disclosed a method of modifying a kerning distance between a pair of modified characters having a shape different from the same pair of characters but unmodified, said method comprising the step of deriving from the changes in shape of the modified characters in the kerning direction a modified kerning distance.

In accordance with a second aspect of the present invention there is disclosed a method of adjusting the kerning distance between adjacent characters in a character string without use of a previously stored distance for each character pair, said adjacent characters comprising a first, positioned character, and a second character to be positioned adjacent said first character and spaced therefrom by the kerning distance, said method comprising the steps of making said second character approach said first character, calculating a two dimensional measure of the approach of said second character to said first character, and stopping said approach when said two dimensional measure passes a threshold value.

In accordance with a third aspect of the present invention there is disclosed a system for adjusting the kerning distance between adjacent characters in a character string without use of a previously stored distance for each character pair, said adjacent characters comprising a first, positioned character, and a second character to be positioned adjacent said first character and spaced therefrom by the kerning distance, said system comprising approach means to make said second character approach said first character, calculating means to calculate a two dimensional measure of the approach of said second character to said first character, and threshold means connected to said approach means and said calculating means to stop said approach when said two dimensional measure passes a threshold value.

In accordance with a fourth aspect of the present invention there is disclosed a computer program product for adjusting the kerning distance between adjacent characters in a character string without use of a previously stored distance for each character pair, said adjacent characters comprising a first, positioned character, and a second character to be positioned adjacent said first character and spaced therefrom by the kerning distance, said product comprising approach means to make said second character approach said first character, calculating means to calculate a two dimensional measure of the approach of said second character to said first character, and threshold means interacting with said approach means and said calculating means to stop said approach when said two dimensional measure passes a threshold value.

In accordance with a fifth aspect of the present invention there is disclosed a method of adjusting kerning for modified characters where a kerning value for each unmodified character pair is known, said method comprising the steps of:

1. estimating an amplitude of the character modification in the kerning direction for each character of the pair, and
2. increasing the kerning value for each character pair by substantially the sum of said amplitudes.

In accordance with a sixth aspect of the present invention there is disclosed apparatus for adjusting the kerning values for modified character pairs based on a known kerning value for each unmodified character pair, said apparatus comprising first memory means to store said known kerning value for each unmodified character pair, value adjusting means to add to each said known value substantially the sum of the estimated amplitudes of the character modification for each character of the pair in the kerning direction, and second memory means to store the sum of said addition as an increased kerning value for each modified character pair.

In accordance with a seventh aspect of the present invention there is disclosed a computer program product for adjusting the kerning values for modified character pairs based on a known kerning value for each unmodified character pair, said product comprising first memory means to store said known kerning value for each unmodified character pair, value adjusting means to add to each said known kerning value substantially the sum of functions which are applied to the estimated amplitudes of the character modification for each character of the pair in the kerning direction, and second memory means to store the sum of said addition as an increased kerning value for each modified character pair.

BRIEF DESCRIPTION OF THE DRAWINGS

Various embodiments of the present invention will now be described with reference to the drawings in which.

DETAILED DESCRIPTION INCLUDING BEST MODE

Figure 1:
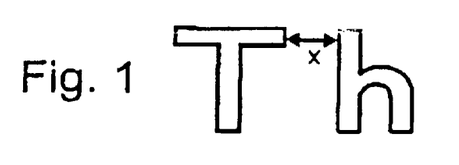
FIG. 1 is a schematic representation of known kerning arrangements.

FIG. 1 illustrates a prior art kerning technique used with regular characters in which the height of adjacent characters is exactly the same (since the vertical extent of a capital T is the same as the vertical extent of a lower case h). As a consequence, measuring the smallest horizontal distance between adjacent characters can be used to provide an appropriate kerning distance x. A similar measure can be used in the case of, say, a capital T and a lower case o since the lower case o nestles up against the stem of the T by a distance x and it does not matter if the cross-bar of the T extends over the lower case o.

Figure 2:
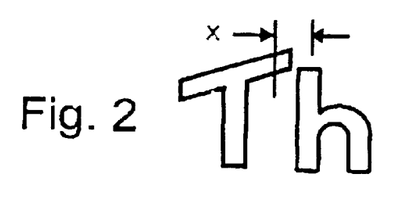
FIG. 2 illustrates how these arrangements break down in the case of modified characters.

However, if the characters should be modified as indicated in FIG. 2, various difficulties arise. Consider the situation where the modification to the conventional characters is to angle all the cross portions upwardly from left to right so that a capital T has a sloping cross-bar as illustrated in FIG. 2. Under these circumstances, the top of the lower case h is not aligned with the right-hand edge of the cross-bar of the T. As a consequence, using the same horizontal distance x between the adjacent characters results in the two characters being placed too closely together and an aesthetically unpleasing result occurs.

Figure 3:
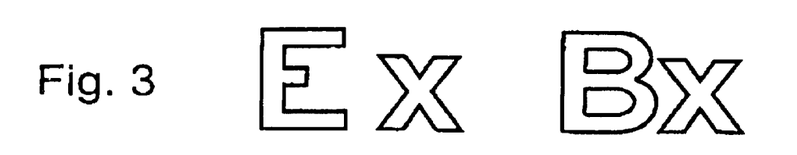
FIG. 3 illustrates the need for different kerning spacings based upon the nature of the adjacent characters.

FIG. 3 illustrates the situation where adjacent characters need to be spaced apart to different extents because of the nature of the characters. Where the adjacent pair is Ex, the two characters approach to the closest extent immediately adjacent the "line" upon which the character string is being assembled. Since the characters only approach at this point, the distance between the characters should be relatively small. However, in the event of the character pair Bx, since the lower curve of the B to some extent nestles into the "v" of the side of lower case x, then the spacing between the adjacent characters should be increased to provide for the illusion of more "white" space between the "black" characters. Where a look-up table is provided for all the various possible pairs of characters, these aesthetic considerations can be easily taken into account, even if this is essentially empirical or subjective.

However, where characters are able to be modified at will by the user of a computer system, the concept of a look-up table specifying kerning distance becomes unworkable because the number of character pairs is astronomically high. Further, it is generally not possible for the supplier of the computer system to predict all possible combinations of modified characters and empirically determine a kerning spacing for each of them.

Figure 4:
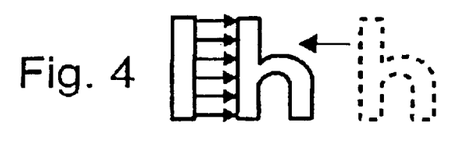
FIGS. 4 and 5 illustrate the kerning of adjacent characters in accordance with a first embodiment of the present invention.
Figure 5:
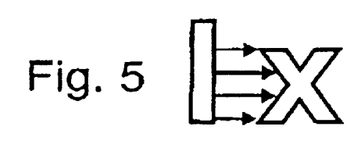

FIGS. 4 and 5 illustrate how these problems can be overcome by introducing a two-dimensional nature into the measurement of spacing between adjacent characters. In FIG. 4 the characters lower case l and lower case h are to be positioned next to each other in a character string. The position of the "left-hand" character lower case l is first determined and then fixed. The "right-hand" character lower case h is then notionally placed in a start position as illustrated by broken lines and moved to the left as seen in FIG. 4 into a finish position as illustrated by solid lines. As the lower case h approaches the lower case l a series of measurements are taken each of which is a horizontal distance between the right-hand edge of the lower case l and the left-hand edge of the lower case h. The various horizontal distances are spaced apart vertically and result in a histogram as illustrated on the left-hand side of FIG. 6.

As indicated in FIG. 5, a similar process is carried out in relation to adjacent letters lower case l and lower case x. This results in a different series of measurements which are indicated in the right-hand histogram of FIG. 6.

In accordance with the first embodiment of the present invention, the average distance of each histogram is calculated and, in addition, also calculated is the variance of each of the measurements from that average distance. For the left-hand histogram of FIG. 6 it will be apparent that the variance of the histogram is zero. In accordance with the first embodiment of the present invention a zero variance should be equated to a minimum kerning distance and therefore the lower case h ceases its approach towards the lower case l only when a minimum threshold value is reached. The minimum threshold value is the minimum kerning distance.

Figure 6:
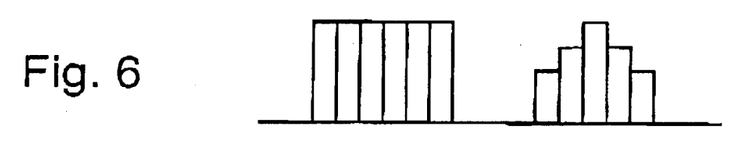
FIG. 6 illustrates a histogram of the spacing between adjacent characters in FIGS. 4 and 5, FIGS. 7 and 8 illustrate the sequence of events in the kerning of adjacent characters in accordance with a second embodiment of the present invention.

However, in relation to the character pair illustrated in FIG. 5, and the resulting right-hand histogram of FIG. 6, it will be seen that there is a substantial variance in the right-hand histogram of FIG. 6. Therefore the approach of the lower case x towards the lower case l in FIG. 5 should be stopped later. That is to say the threshold value is decreased because there is vertical variance from the means of the various horizontal distances.

Preferably the adjustment of the kerning distance is inversely proportional to the variance.

Figure 7:
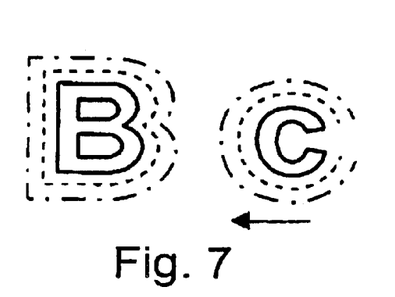
Figure 8:
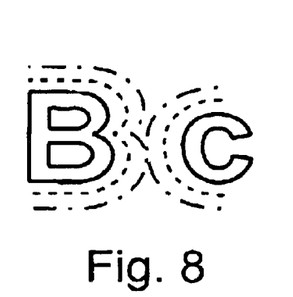

In the second embodiment illustrated in FIGS. 7 and 8, the character pair capital B and lower case c are shown. The left-hand character, B, has a fixed position and the right-hand character, c, is made to approach it from the right. For both characters a contour of spacing from the exterior surface of the character, or the character outline, is calculated by the computer controlling the printer or other display device. As indicated in FIGS. 7 and 8, a first contour line being a first predetermined spacing distance from the exterior of the characters is indicated by dotted lines. The outline of the characters themselves is indicated in solid lines. A second contour, being twice the predetermined contour distance from the character outline is indicated by a dot dash line, and so on if necessary. In the embodiment of FIGS. 7 and 8, the right-hand character, c, approaches the left-hand character, B, until the second contour lines just intersect as indicated in FIG. 8. This is because for the second embodiment illustrated in FIGS. 7 and 8 the threshold value is deemed to be the intersection of the second contour line.

Figure 9:
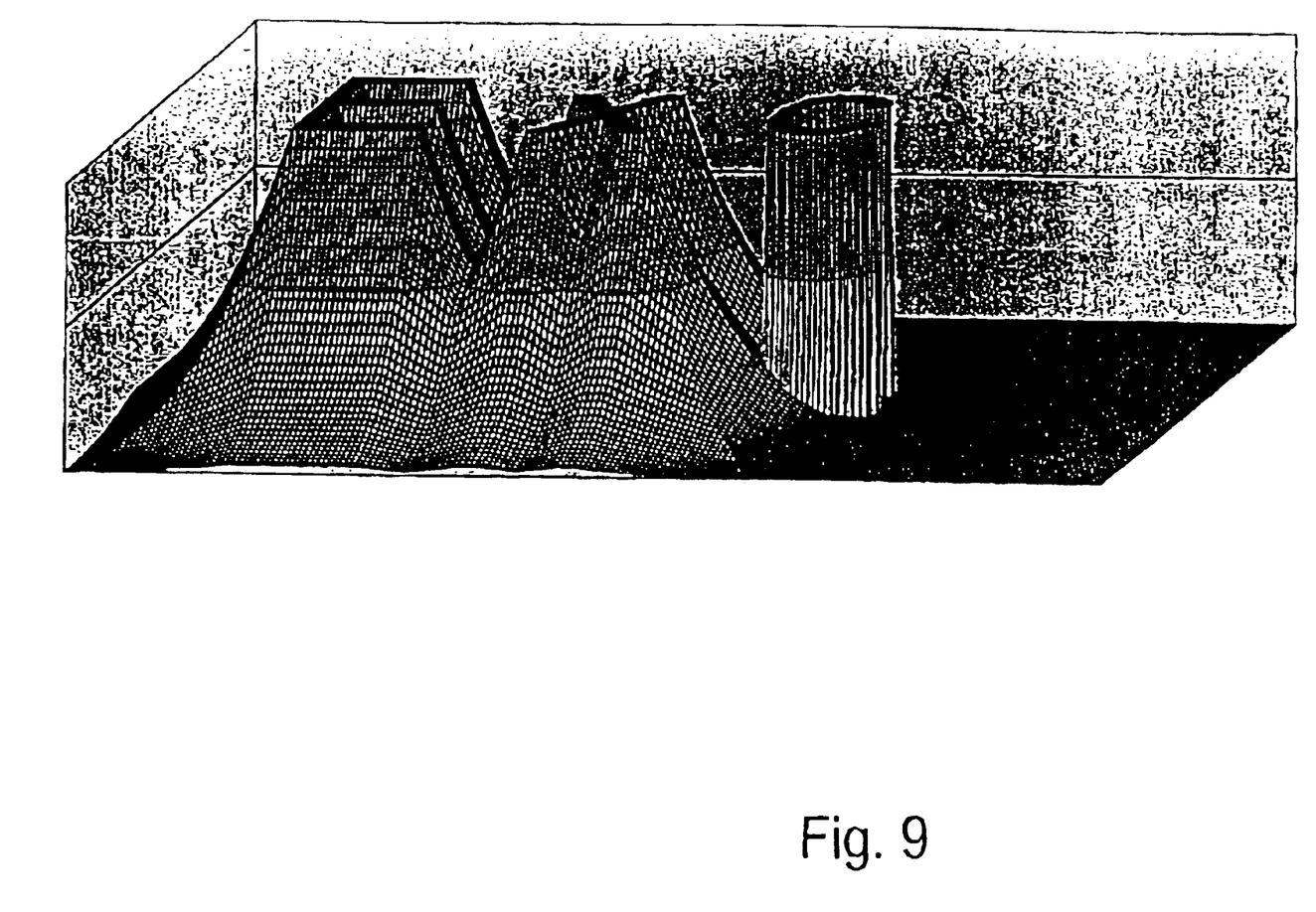
FIG. 9 is a three-dimensional perspective view illustrating the principles of the second embodiment.

FIG. 9 illustrates schematically in three-dimensional form the displacement of the letters E, x, c into a character string. The position of the first character, E, is fixed. The second character, x, is approaching from the right and this approach is stopped when a given contour of the two characters intersect. In FIG. 9 the third character, c, is "waiting in the wings". Therefore the contours for the character c will not be calculated until such time as the positioning of the second character, x, is finalised. In this way only two full character contours need to be calculated and therefore the computational burden on the computer is reduced. Once the position of the second character, x, is finalised, the contour of the first character, E, is overwritten with the contours already calculated for the character, x, and the contours for the next character, c, are then calculated. These two pairs of contours are then used in order to determine the positioning of that character.

It will be appreciated by those skilled in the art that the spacing between adjacent characters is calculated from the nature of the characters themselves and therefore does not depend upon any previously stored information. In particular there is no kerning look-up table. Naturally there are penalties to be paid in relation to this procedure, particularly in relation to the speed with which the kerning distance between adjacent characters can be determined.

Figure 10:
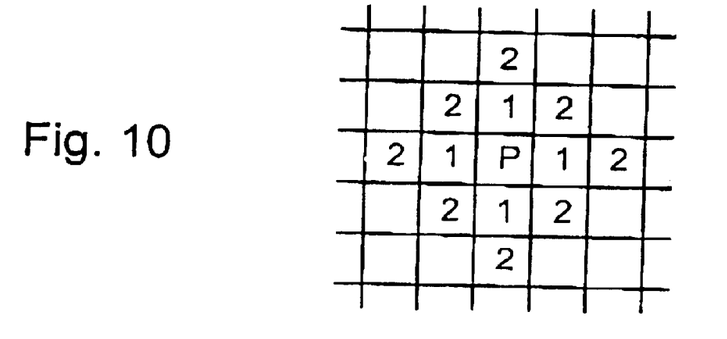
FIG. 10 illustrates the "city block" distances from a given pixel P.

FIG. 10 illustrates one known method of determining a spacing from a given pixel P. The immediately adjacent pixels, of which there are four are numbered 1 and are regarded as being a unit spacing from the pixel P. The next most adjacent pixels, of which there are eight, are regarded as being spaced a distance two units from the pixel P and thus are indicated in FIG. 10 by the numeral 2. This determination of spacing from a given pixel is known as "city block" (or Manhattan distance) spacing.

Figure 11:
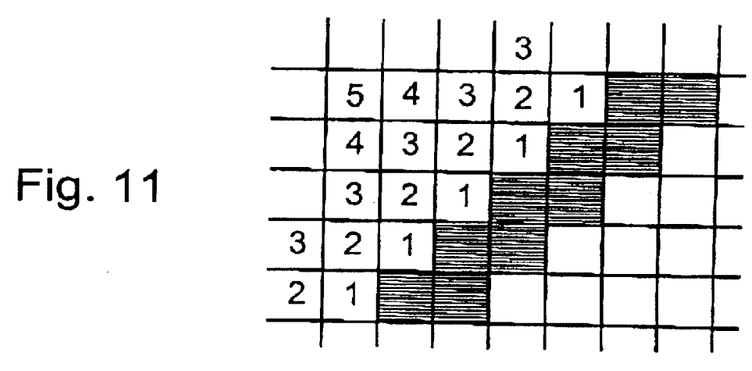
FIG. 11 illustrates the "city block" contoured distances from an irregular surface of a character.

FIG. 11 illustrates how "city block" spacing can be utilised to determine a spacing contour. In FIG. 11 the shaded pixels constitute, for example, the left-hand side of the character A. As a consequence, the "contour line" being one unit spacing from the character edge is indicated by the line of pixels numbered 1. Similarly, the contour line spaced two units from the edge of the character is indicated by the line of pixels numbered 2, and so on. In this way it is easy to determine a contour map of the general type indicates in FIGS. 7, 8 and 9. Other methods of calculating a contour can also be used including Euclidean distance methods.

Figure 12:
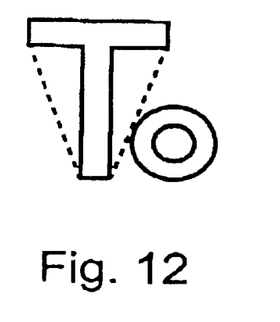
FIG. 12 illustrates the use of a convex hull as a limit in kerning.

In some instances it is necessary to provide a limit to the kerning distance to be calculated above. FIG. 12 illustrates one form of limit in which the convex hull of the character as indicated by a broken line in FIG. 12 is used to provide a limit beyond which an adjacent character cannot extend. The convex hull is well known in computing circles to be the outline formed by stretching a rubber band around the character. FIG. 12 illustrates how a lower case o cannot approach an upper case T any closer than the boundary provided by the convex hull of the upper case T.

Figure 13:
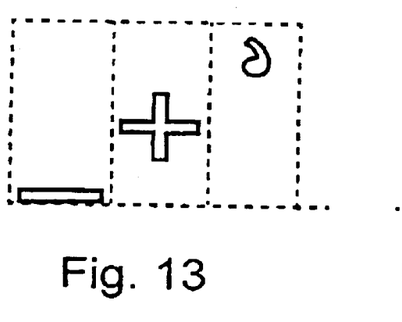
FIG. 13 illustrates the use of vertical edges of bounding boxes as a limit in kerning.
Figure 14:
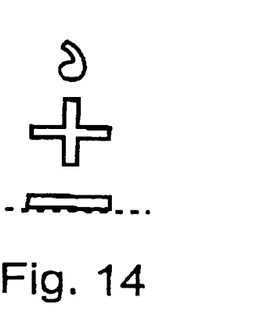
FIG. 14 illustrates what might happen to the characters of FIG. 13 in the absence of such a limit.

FIGS. 13 and 14 illustrate a similar problem in relation to some other characters being an "on the line dash" (generally used in underlining), a plus sign, and an apostrophe. FIG. 13 illustrates the preferred arrangement in which each character is provided with a rectangular bounding box and the vertical edges of the bounding boxes provide a limit to the closest approach of the characters. FIG. 14 illustrates the possibility which could arise if the limit indicated in FIG. 13 did not apply.

Figure 15:
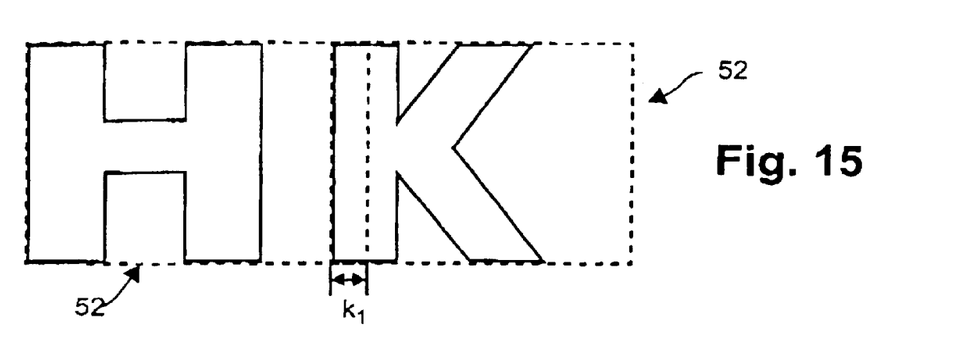
FIG. 15 is a view of two unmodified characters showing the kerning value for such characters.

Turning now to the situation where kerning values are stored for each character pair, as seen in FIG. 15, a pair of characters H, K are shown arranged "along the line" upon which a string of characters is to be written. Each character is located within its own bounding box 52 indicated by dotted lines. As is well known, in the process of kerning, the distance between the adjacent bounding boxes is adjusted in order to achieve an aesthetically pleasing result. Since the number of characters in a font is fixed, the kerning values are conveniently stored in memory with the appropriate value for each possible character pair being thus stored.

In this way, as each successive character is placed in the string of characters, the appropriate kerning value is looked up and the necessary adjustment between the adjacent bounding boxes made. This is a quick and easy procedure which enables high speed printing or other display to be carried out.

Figure 16:
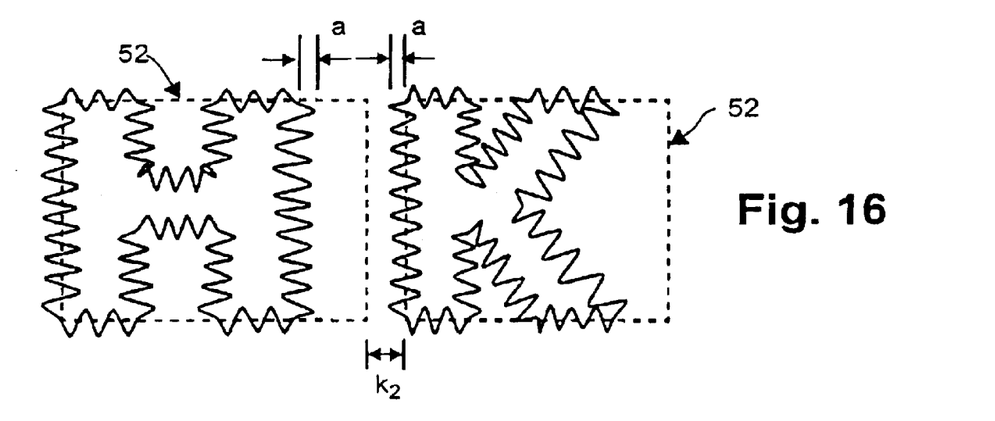
FIG. 16 is a view similar to FIG. 1 but showing the arrangement for modified characters.

FIG. 16 illustrates a modified pair of characters which are modified by the application of a substantially sinusoidal wave to the character outline. The effect of the modification is to move the edge of the character inwards, and outwards, by a predetermined amplitude "a" from its unperturbed position. In FIG. 16 the amplitude "a" of the sine wave is indicated (being one half the peak to peak value) and it will be apparent to those skilled in the art that since the characters are thus modified, there will need to be some modification of the kerning value for the modified character pair.

In FIG. 15 the kerning value for the unmodified character pair is given by $k_1$ whilst in FIG. 16 the kerning value for the modified character pair is given as k. In accordance with the preferred embodiment of the present invention, since the outline of the right-hand side of the character H has been moved to the right by a distance a, and the outline of the left-hand side of the character K has been moved to the left by a distance equal to the amplitude a, the new kerning value k should be increased over the original kerning value $k_1$ by twice the amplitude a. That is, expressed mathematically:

$$k = k_1 + 2a \quad [1]$$

Figure 17:
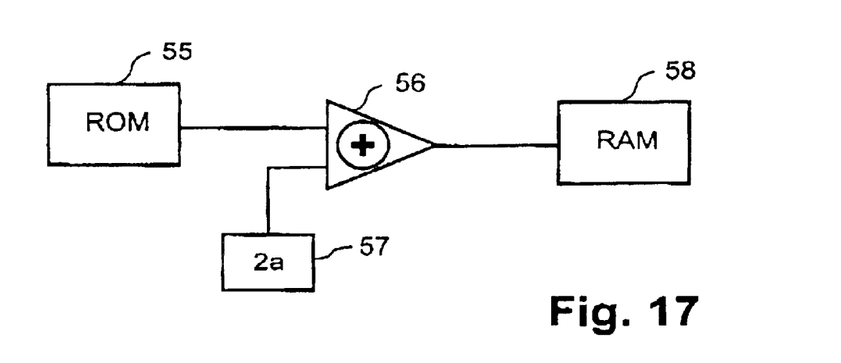
FIG. 17 is a schematic circuit diagram of one embodiment of hardware by means of which the preferred embodiment of the present invention can be implemented.

FIG. 17 schematically illustrates a circuit for carrying out the required modification in accordance with equation [1]. A read only memory 55 is used to store the kerning values for each pair of unmodified characters and is connected to one input of an adder 56. The other input of the adder 56 is connected to register 57 loaded with a constant value which is twice the amplitude a. The output of the adder 56 is stored in a second memory in the form of RAM 58.

Figure 18:
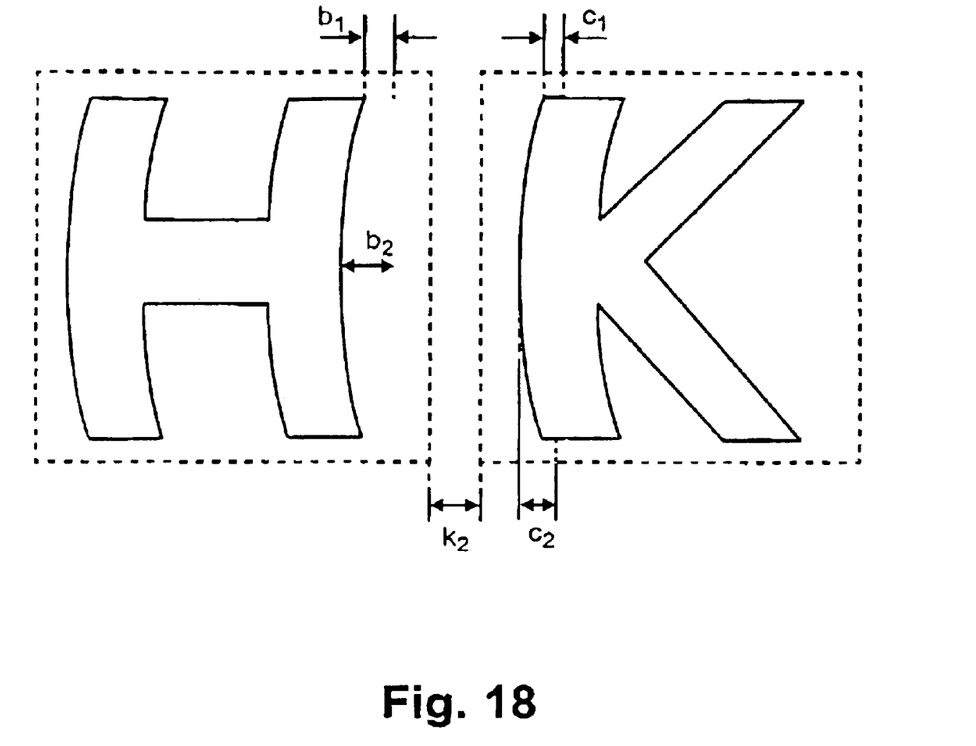
FIG. 18 is a view of two characters modified by a large amplitude, low frequency perturbation.

FIG. 18 illustrates a pair of characters which are modified by application of a substantially sinusoidal wave to the character outline. The sinusoidal perturbation has a low frequency, and consequently has a wavelength which is substantially of the same order as the size of the characters. This results in the character outlines being adjusted outward (i.e. in a convex fashion) in some instances, and inward (i.e. in a concave fashion) in other cases. In FIG. 18, in accordance with the preferred embodiment of the present invention, the outline of the top right-hand side of character H has been moved to the left by a distance $b_1$ and the outline of the top left-hand side of character K has been moved to the left by a distance $c_1$. Thus the new kerning value k should be decreased over the original kerning value $k_1$ by $c_1$, and should be increased over the original kerning value $k_1$ by $b_1$. That is, expressed mathematically:

$$k=k_1-c_1+b_1 \quad [2]$$

Alternatively, different aspects of the perturbed characters may be considered. Thus, since the outline of the right-hand centre of character H has been moved to the left by a distance $b_2$ and the outline of the left-hand centre of character K has been moved to the left by a distance $c_2$, the new kerning value k should be decreased over the original kerning value $k_1$ by $c_2$, and increased by $b_2$. That is, expressed mathematically:

$$k=k_1-c_2+b_2 \quad [3]$$

A general kerning adjustment equation may, therefore, be tailored to correctly kern text undergoing specific distortions. The general equation is expressed mathematically as follows:

$$k=k_1+f(a)+g(b) \quad [4]$$

where a is the amplitude of the perturbation applied to the left-hand character H, and b is the amplitude of the perturbation applied to the right-hand character K. Furthermore, f is an arbitrary function or operator which is applied to amplitude a, and g is an arbitrary function or operator which is applied to amplitude b.

Figure 19:
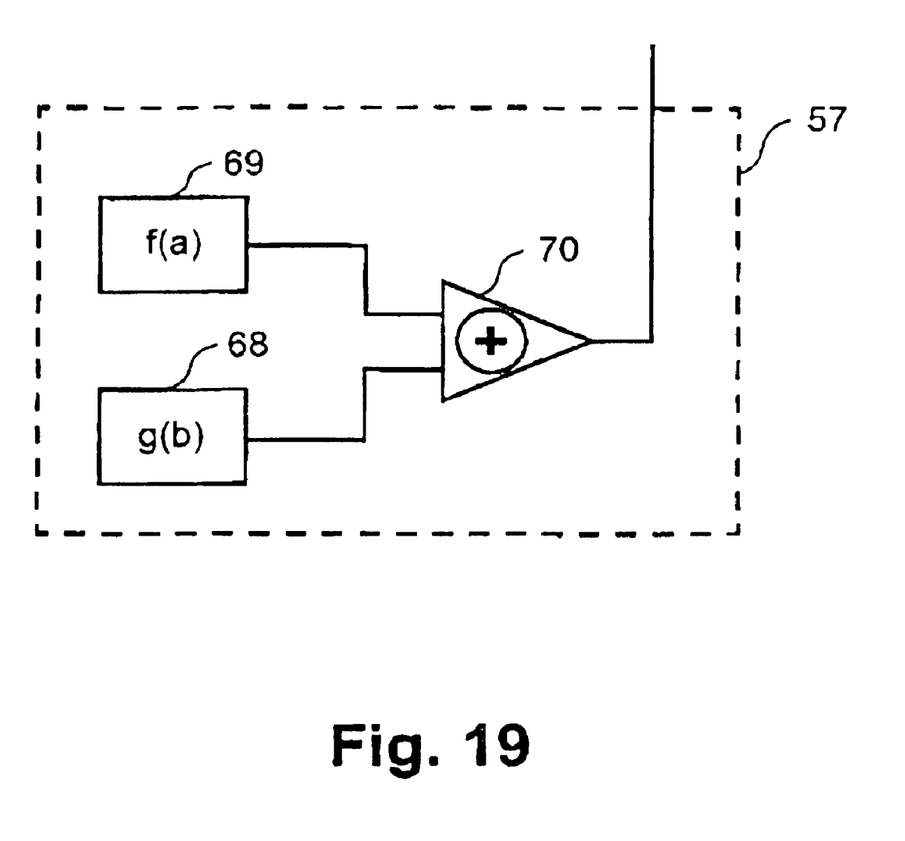
FIG. 19 is a generalisation of the circuit of FIG. 17.

FIG. 19 schematically illustrates a generalization of the circuit depicted in FIG. 17, the generalisation being in accordance with equation [4]. Register 57 (see FIG. 17) is replaced by two registers 68 and 69, whose contents (g(b) and f(a) respectively) are summed by adder 70.

In printing or otherwise displaying the modified characters, the printer or other display device takes the kerning value for each pair of values from RAM 58 instead of from ROM 55 and in this way adjusts the kerning for the modification made to the characters.

Figure 20:
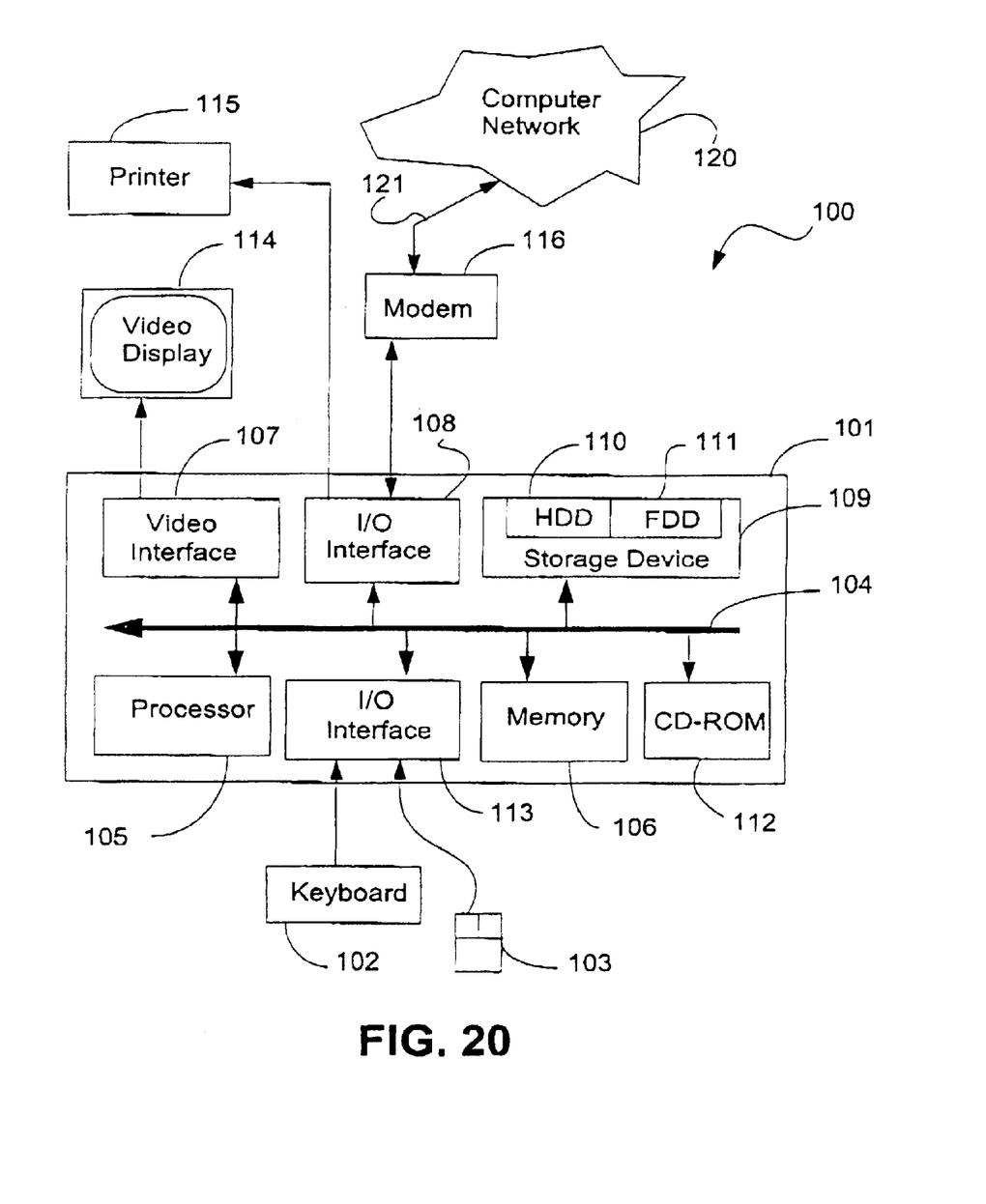
FIG. 20 is a schematic block diagram of a general purpose computer able to implement the system of the preferred embodiments.

Turning now to FIG. 20, the above described methods are preferably practiced using a conventional general-purpose computer system 100, such as that shown in FIG. 20. The above described methods can be implemented as software, such as an application program executing within the computer system 100. In particular, the steps of the method are effected by instructions in the software that are carried out by the computer. The software may be divided into two separate parts; one part for carrying out the methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for carrying out the embodiments of the invention.

The computer system 100 comprises a computer module 101, input devices such as a keyboard 102 and mouse 103, output devices including a printer 115 and a display device 114. A Modulator-Demodulator (Modem) transceiver device 116 is used by the computer module 101 for communicating to and from a communications network 120, for example connectable via a telephone line 121 or other functional medium. The modem 116 can be used to obtain access to the Internet, and other network systems, such as a Local Area Network (LAN) or a Wide Area Network (WAN).

The computer module 101 typically includes at least one processor unit 105, a memory unit 106, for example formed from semiconductor random access memory (RAM) and read only memory (ROM), input/output (I/O) interfaces including a video interface 107, and an I/O interface 113 for the keyboard 102 and mouse 103 and optionally a joystick (not illustrated), and an interface 108 for the modem 116. A storage device 109 is provided and typically includes a hard disk drive 110 and a floppy disk drive 111. A magnetic tape drive (not illustrated) may also be used. A CD-ROM drive 112 is typically provided as a non-volatile source of data. The components 105 to 113 of the computer module 101, typically communicate via an interconnected bus 104 and in a manner which results in a conventional mode of operation of the computer system 100 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 110 and read and controlled in its execution by the processor 105. Intermediate storage of the program and any data fetched from the network 120 may be accomplished using the semiconductor memory 106, possibly in concert with the hard disk drive 110. In some instances, the application program may be supplied to the user encoded on a CD-ROM or floppy disk and read via the corresponding drive 112 or 111, or alternatively may be read by the user from the network 120 via the modem device 116. Still further, the software can also be loaded into the computer system 100 from other computer readable medium including magnetic tape, a ROM or integrated circuit, a magneto-optical disk, a radio or infrared transmission channel between the computer module 101 and another device, a computer readable card such as a PCMCIA card, and the Internet and Intranets including email transmissions and information recorded on websites and the like. The foregoing is merely exemplary of relevant computer readable media. Other computer readable media may be practised without departing from the scope and spirit of the invention.

The above described methods may alternatively be implemented in dedicated hardware (in addition to that disclosed in FIGS. 17 and 19) such as one or more integrated circuits performing the functions or sub-functions of the method. Such dedicated hardware may include graphic processors, digital signal processors, or one or more microprocessors and associated memories.

Figure 21:
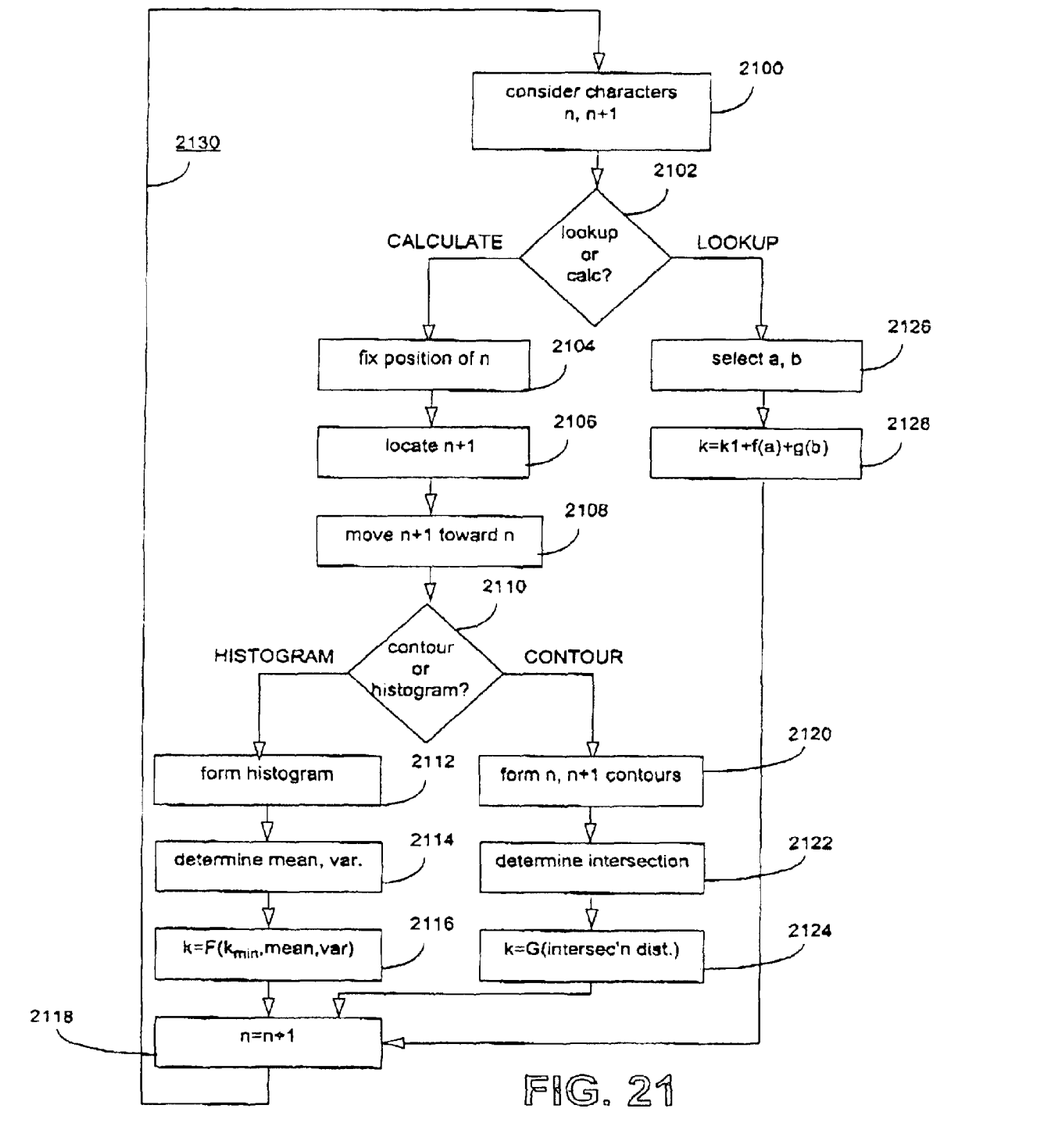
FIG. 21 is a process flow diagram which can be practiced on the general purpose computer described in relation to FIG. 20.

FIG. 21 illustrates an automatic kerning process flow diagram which incorporates a number of the embodiments previously described. Commencing with a process 2100, a left-hand character "n", and right-hand character "n+1", are to be considered. Thereafter, in a decision process 2102, a selection can be made of either a calculation method, or alternatively, a look-up method. Considering initially the calculation process, we are directed from the decision process 2102 to a process 2104 where a position for the left-hand character n is fixed. Thereafter, the right-hand character n+1 is notionally located at a position on the right hand side of n. In the next process 2108, the right hand character n+1 is progressively moved towards the left hand character n. At this point, a second decision process 2110 permits a selection between a histogram method, or alternatively a contour method. Considering the histogram method initially, we are directed to a process 2112 where a histogram is formed as was described in relation to FIGS. 5 and 6. The following process 2114 determines a mean and variance for the calculated histogram, after which a kerning distance "k" is determined as a function "F" of a minimum kerning distance ($k_{min}$), and a mean, and variance of the aforementioned histogram. Thereafter, in a process 2118, the now-correctly positioned right-hand character n+1 is redefined as the left-hand character n, after which the overall kerning process is directed as depicted by an arrow 2130 back to the initial process 2100. In the event that a contour method is selected at the decision process 2110, contours are formed around the characters n, and n+1 in a process 2120, as was described in relation to FIGS. 7 and 8. Thereafter, an intersection between selected contours is determined in a process 2122, after which a kerning distance k is determined as a function "G" of the intersection distance, this being performed in a process 2124. Thereafter, the overall process is directed to the process 2118, where the now correctly positioned right-hand character n+1 is redefined as the left-hand character n, and the overall kerning process is again directed as depicted by the arrow 2130 to the initial process 2100. Returning to the decision block 2102, if, instead of a calculation method, a look-up method is selected, amplitudes "a", and "b", are selected in a process 2126, as has been described in relation to FIG. 18, and Equation [4]. Thereafter, a kerning distance k is determined as a function of original kerning function $k_1$, and a function "f" of amplitude a, and a second function "g" of amplitude b. Thereafter, the overall process is again directed to process 2118, and so on.

The forgoing describes only some embodiments of the present invention and modifications, obvious to those skilled in the art, can be made thereto without departing from the scope of the present invention.

For example, although a sinusoidal modification of the characters has been illustrated in FIG. 16, the modification could equally have been in the form of a square wave or a triangular wave or some other blurring or other distortion of the initial character outline.

In the context of this specification, the word "comprising" means "including principally but not necessarily solely" or "having" or "including" and not "consisting only of". Variations of the word comprising, such as "comprise" and "comprises" have corresponding meanings.

What is claimed is:

1. A method of adjusting kerning for a pair of characters to be modified, the pair of characters being members of a set of characters, where a kerning value for each unmodified character pair in the set is known, said method comprising the steps of:

a. estimating, independent of any characters in the set other than the pair of characters to be modified, an amplitude of the character modification in the kerning direction for each character of the pair, wherein the modification to each character comprises perturbing the outline of the character;

b. applying a function to each amplitude; and c. increasing the kerning value for the character pair by substantially the sum of the applied functions.

2. A method as claimed in claim 1, wherein the perturbation is selected from the group consisting of sinusoidal, square wave, and triangular wave perturbations.

3. Apparatus for adjusting the kerning value for a pair of characters to be modified, the pair being members of a set of characters, wherein a kerning value for each unmodified character pair in the set is known, said apparatus comprising:

first memory means to store said known kerning value for each unmodified character pair in the set;

estimation means for estimating, independent of any characters in the set other than the pair of characters to be modified, an amplitude of the character modification in the kerning direction for each character of the pair, wherein the modification to each character comprises perturbing the outline of the character;

function applying means for applying a function to each said amplitude;

value adjusting means to add to said known kerning value for the pair of characters to be modified substantially the sum of the applied functions; and second memory means to store the sum of said addition as an increased kerning value for the modified character pair.

4. Apparatus as claimed in claim 3, wherein said first memory means is a ROM.

5. Apparatus as claimed in claim 3, wherein said second memory means is a RAM.

6. Apparatus as claimed in claim 3, wherein said value adjusting means is an adder.

7. A computer program product for adjusting the kerning for a pair of characters to be modified, the pair being members of a set of characters, wherein a kerning value for each unmodified character pair in the set is known, said product comprising:

first memory means to store said known kerning value for each unmodified character pair in the set;

estimation means for estimating, independent of any characters in the set other than the pair of characters to be modified, an amplitude of the character modification in the kerning direction for each character of the pair, wherein the modification to each character comprises perturbing the outline of the character;

function applying means for applying a function to each said amplitude;

value adjusting means to add to said known kerning value for the pair of characters to be modified substantially the sum of the applied functions; and second memory means to store the sum of said addition as an increased kerning value for the modified character pair.

8. The product as claimed in claim 7, wherein said value adjusting means operates in accordance with the equation:

$$k = k_1 - f(a) + f(b)$$

where k is the adjusted kerning distance, $k_1$ is the known kerning distance, a is the amplitude of the modification applied to a first of the characters of said pair of characters, b is the amplitude of the modification applied to the second of the characters of said pair of characters, and f represents the function applied to the estimated amplitudes of the character modification.

9. The product as claimed in claim 8, where the function has a maximum amplitude of f(max)=a and said value adjusting means operates in accordance with the equation:

$$k = k_1 + 2a.$$

* * * * *

UNITED STATES PATENT AND TRADEMARK OFFICE
CERTIFICATE OF CORRECTION

PATENT NO. : 6,829,748 B1
DATED : December 7, 2004
INVENTOR(S) : Cameron Bolitho Browne et al.

It is certified that error appears in the above-identified patent and that said Letters Patent is hereby corrected as shown below:

Column 2,
Line 35, "value" should read -- kerning value --.

Column 5,
Line 54, "indicates" should read -- indicated --.

Signed and Sealed this

Twenty-fourth Day of January, 2006

JON W. DUDAS
*Director of the United States Patent and Trademark Office*